Trefftz & Slimpert.
Cultivator.

N° 85,709.  Patented Jan. 5, 1869.

Witnesses:
R. T. Campbell
J. N. Campbell

Inventors:
Lewis Trefftz
George H. Slimpert

United States Patent Office.

LEWIS TREFFTZ AND GEORGE H. SHIMPERT, OF PINCKNEYVILLE, ILLINOIS.

Letters Patent No. 85,709, dated January 5, 1869.

IMPROVEMENT IN COMBINED WHEELBARROW AND CULTIVATOR.

The Schedule referred to in these Letters Patent and making part of the same.

*To all whom it may concern:*

Be it known that we, LEWIS TREFFTZ and GEORGE H. SHIMPERT, of Pinckneyville, in the county of Perry, and State of Illinois, have invented a Combined Wheelbarrow and Cultivator; and we do hereby declare that the following is a full, clear, and exact description thereof, reference being had to the accompanying drawings, making a part of this specification, in which—

Similar letters of reference indicate corresponding parts in the several figures.

Figure 1:
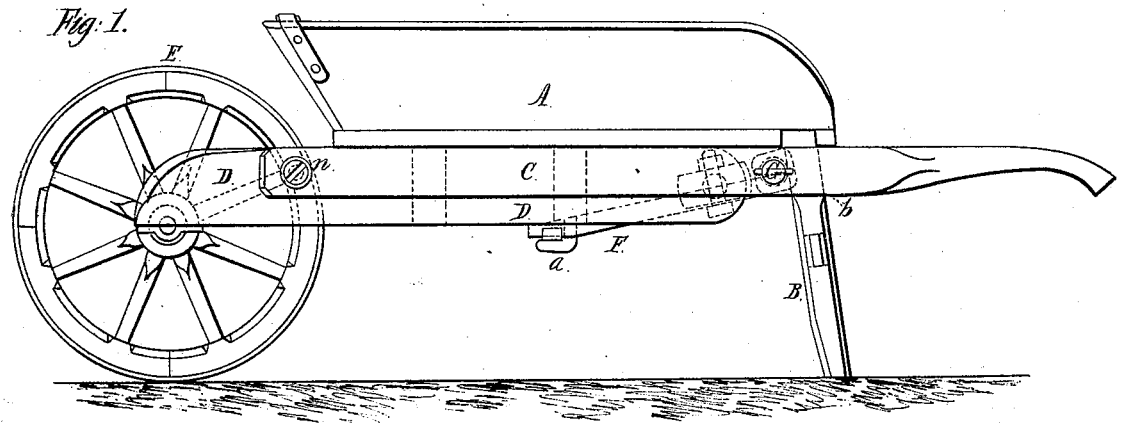
Figure 1 is an elevation of one side of the combined wheelbarrow and cultivator, arranged as a wheelbarrow.

The object of this invention is to adapt the frame of a wheelbarrow to serve as a support for the box or body of the same, and also as a cultivator-frame, when said box is removed from it.

The nature of our invention consists in a wheelbarrow, which is constructed with a removable box or body, and also with a frame which is adapted for having fastened to it the standards of shovels, rakes, or other implements for working the soil, and which can be adjusted in proper manner for allowing implements to be managed with facility, as will be hereinafter explained.

To enable others skilled in the art to understand our invention, we will describe its construction and operation.

In the accompanying drawings—

A represents the box or body of a wheelbarrow, which box may be constructed in any suitable manner, and of any required capacity.

The box shown in the drawings has flaring sides and end secured to a bottom board, to the lower side of which catch-plates, g g, are secured, which serve, in conjunction with notches b made in the legs B, as means for securing the box to its frame.

The legs B B are both rigidly secured to the box A, so as to be removable therewith, and to serve as supports in rear of wheel A, when the box is adjusted on its frame for use as a wheelbarrow.

The frame, which is adapted for the box A, consists of two parallel beams, D D, which are mounted at their front ends upon a wheel, E, and two arms or handles, which are pivoted at their front ends to said beams, and again attached to them at their rear ends by means of a slotted bar and rocking connections.

The two parallel beams D D are secured together, so as to leave a narrow space between them, by means of cross-pieces, c c, and to their forward ends the wheel E is applied.

Figure 3:
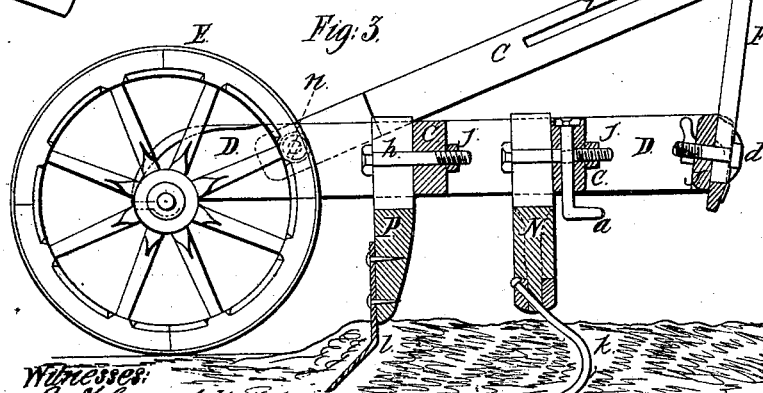
Figure 3 is a longitudinal vertical section, showing the parts arranged and adapted to operate as a cultivator.

Between the rear ends of the beams D D, and suitably pivoted to them, is a rocking bar, J, to the middle of the length of which a slotted rod, F, is attached by means of a nut and screw, d, as shown in fig. 3.

This slotted rod F is secured to a rocking bar, G, which has its end-bearings in the two arms C C, and which is so attached to these arms as to serve as a lateral brace therefor.

The nut which is on the bolt d, is provided with a handle, so that it can be readily loosened or tightened without the use of a wrench.

It will be seen that the arms or handles C C are pivoted at their front ends to the sides of the two beams, by means of a slotted rod, F, and rocking connections, so constructed that, by simply loosening the nut on bolt d, the said arms or handles can be adjusted at any desired angle, with respect to beams D D, which is found most convenient in using the machine as a cultivator.

By tightening the said nut, the rod F can be secured rigidly in such desired position, and will serve as a handle-standard, as shown in fig. 3.

Figure 2:
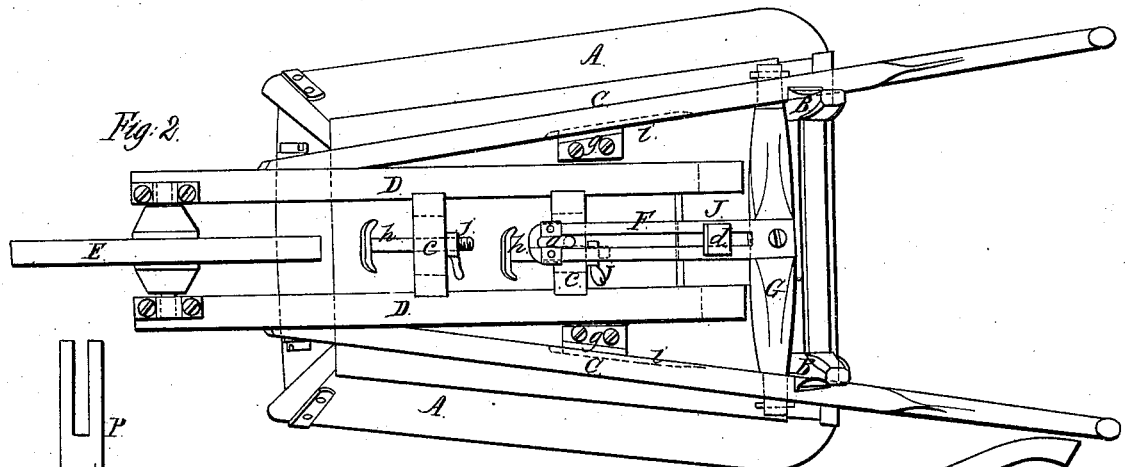
Figure 2 is a bottom view of fig. 1.

By again loosening the nut on bolt d, and adjusting the handles C so that their upper edges will lie in the plane of the upper edges of beams D D, and then tightening the said nut, I have a frame which is adapted for receiving upon it the body or box of the wheelbarrow, as shown in figs. 1 and 2.

By means of the swivel-hook a, which is applied to the bottom edge of the rear cross-piece c, and which passes through the slot through rod F, when this rod is adjusted as shown in figs. 1 and 2, this rod F will be held firmly in place, and keep arms or handles C in place.

On the inner sides of the arms or handles C C, oblong slots, i, are made, which will receive the tongues on catch-plates g g, and allow these plates to hold the box A down firmly in place upon its bed or frame; and, as a further security against the casual attachment of the said box, notches, b, are made in the legs B, just below the bottom of the box, which will receive the arms or handles C, when this box is applied thereto by sliding it forward thereupon.

Through each one of the cross-pieces c, at the middle of its length, a bolt, h, is passed loosely, having a T-shaped head upon its front end, and a nut, j, upon its rear end.

These devices are designed to serve as means for securing slotted standards, P N, of shovels and rakes to the said pieces c c, when the parts are adjusted as shown in fig. 3, to be used for tilling the soil.

Figure 4:
Figure 5:
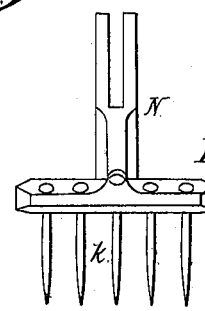

The drawings, Figures 3, 4, and 5, represent two different implements applied to the frame, and, in practice, a variety of implements may be employed, in connection with the wheelbarrow, for the different operations in tilling the soil and cultivating crops.

Believing ourselves to be the first and original inventors of a combined wheelbarrow and cultivator-frame, we do not confine our invention to the precise construction of the frame, nor to the precise devices shown and described for attaching the box A to its frame, nor to the device for attaching the handles to the frame, but desire to be understood as claiming all mechanical equivalents of these devices when employed in the connections and substantially in the manner shown.

Having described our invention,

What we claim as new, and desire to secure by Letters Patent, is—

1. A combined cultivator-frame and wheelbarrow, constructed substantially as described.

2. The beams D D, the pivoted handles C C, the wheel E, and the adjustable handle-standard F, combined and adapted to serve the purposes described.

3. The T-head bolts $h$ and clamp-nuts $j$, or their equivalents, applied to a frame which is adapted to serve the purposes substantially as described.

LEWIS TREFFTZ.
G. H. SHIMPERT.

Witnesses:
D. B. VAN SYCKEL,
J. D. HAMILTON.